United States Patent Office 3,399,840
Patented Sept. 3, 1968

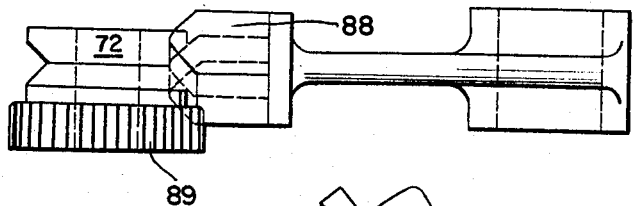
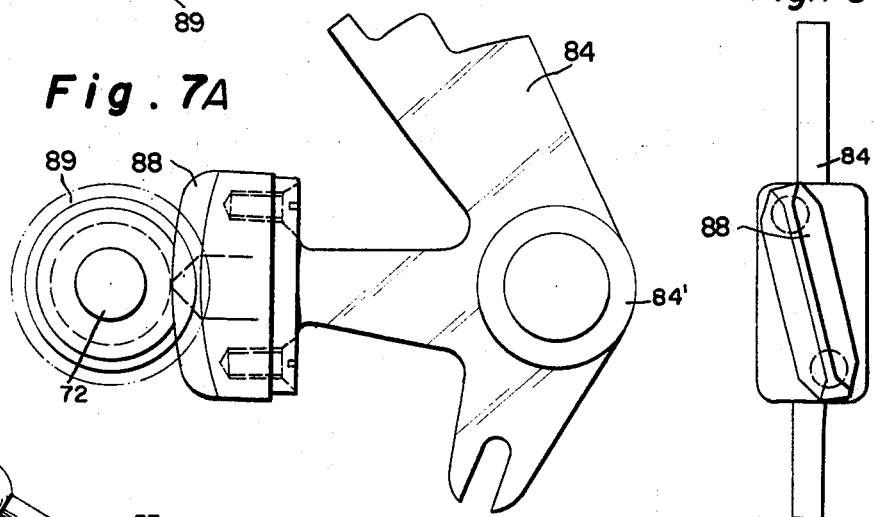
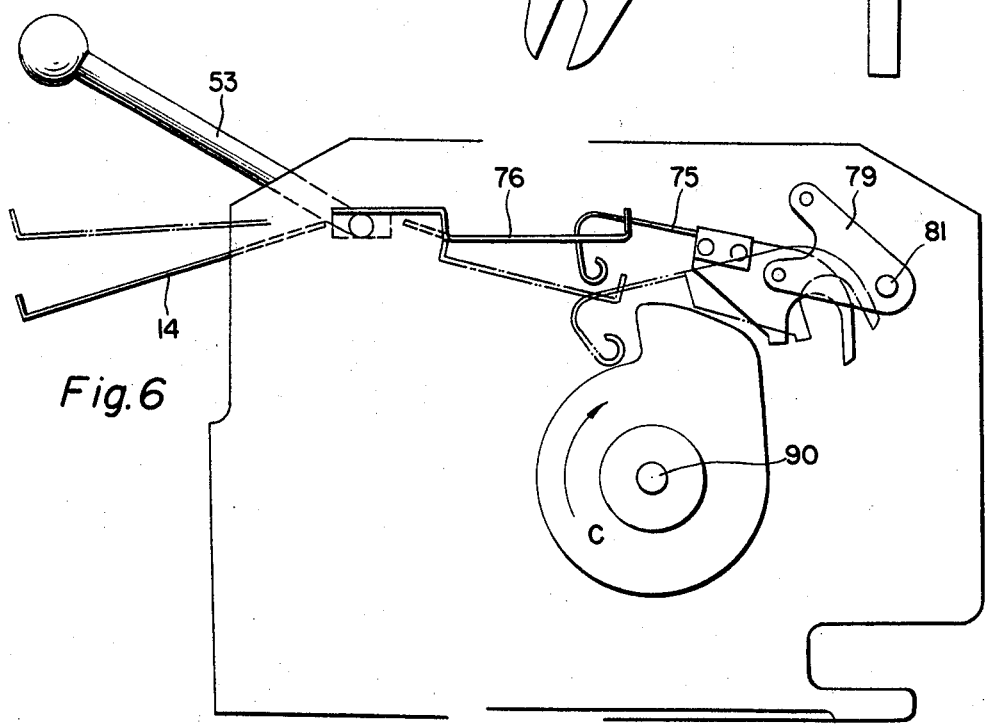

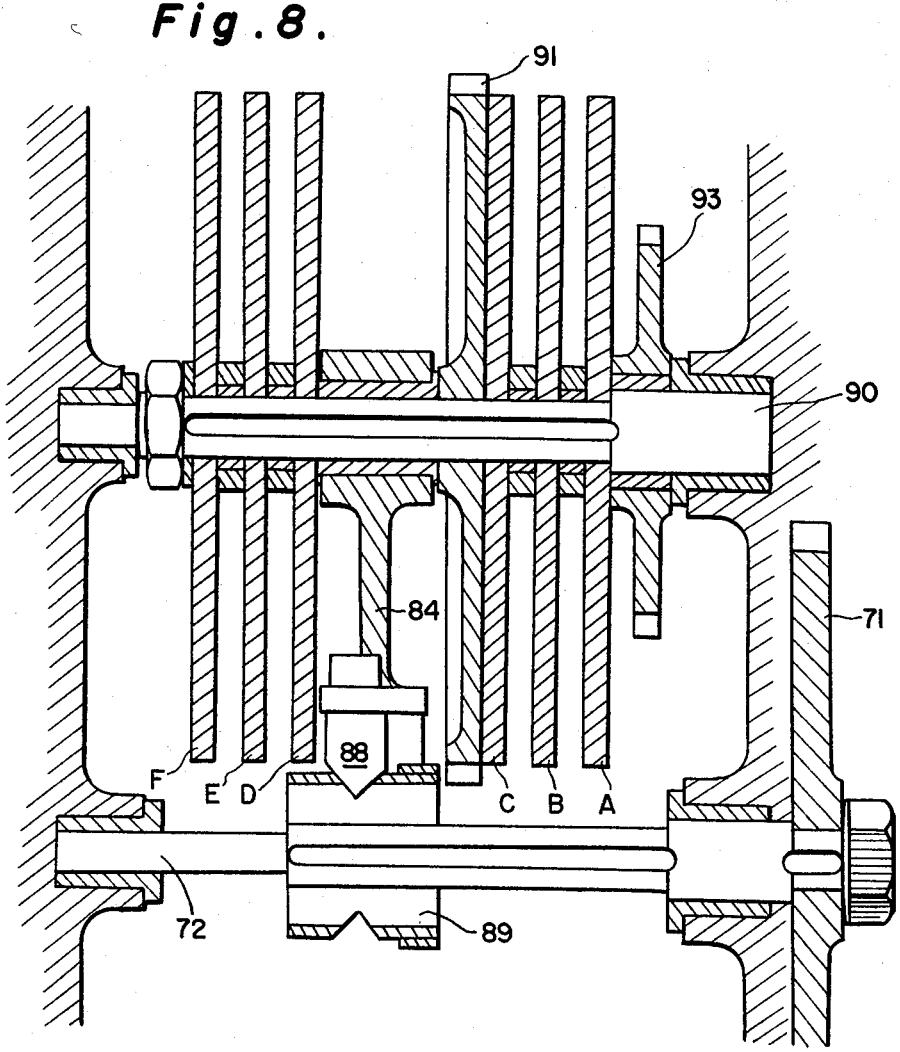

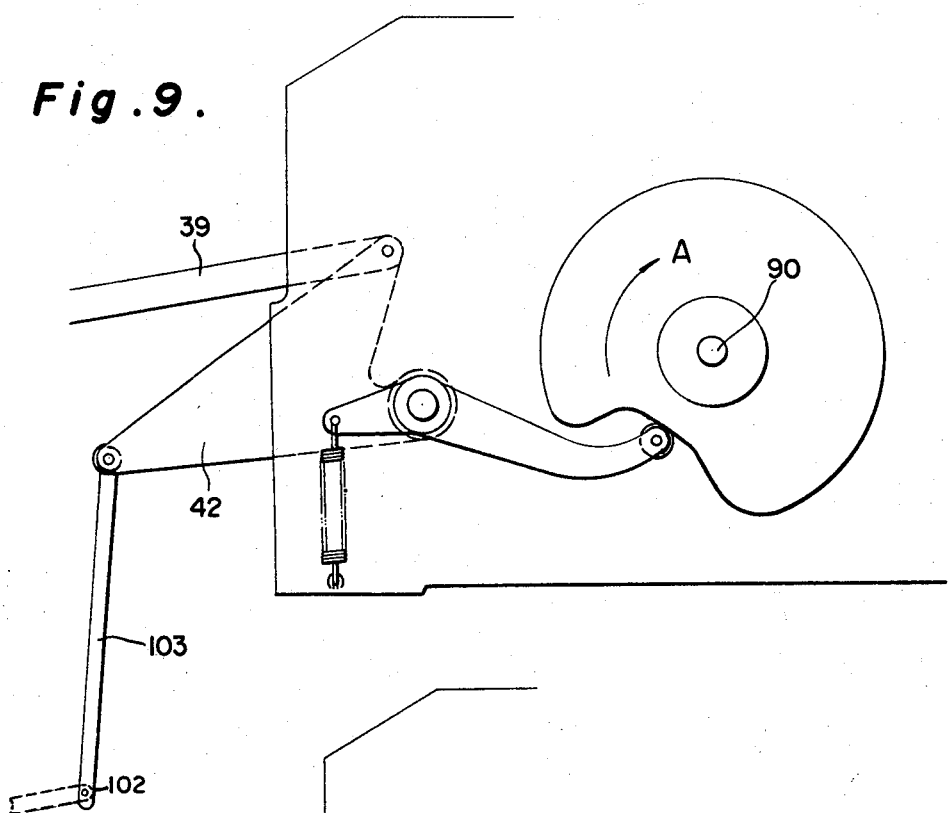
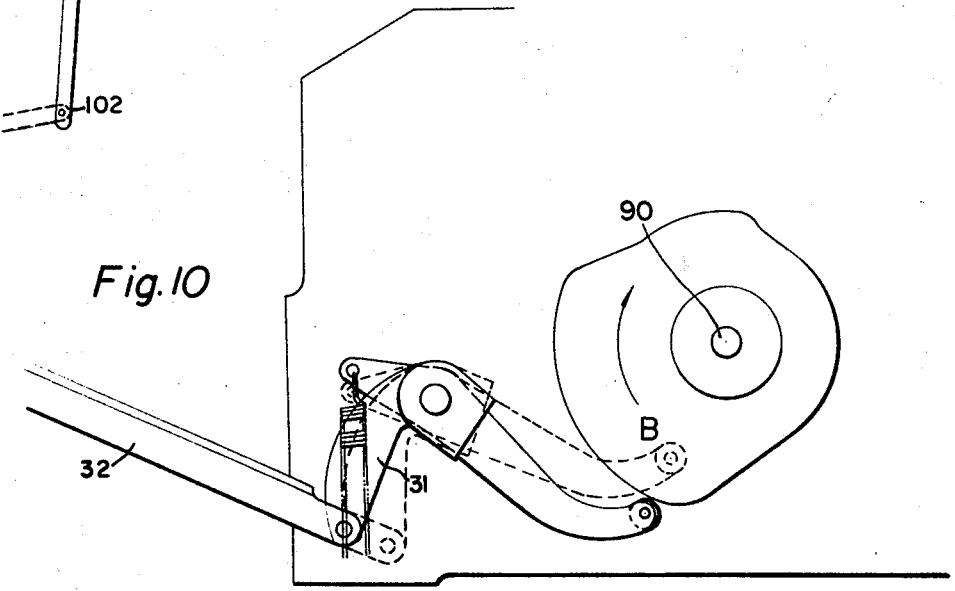

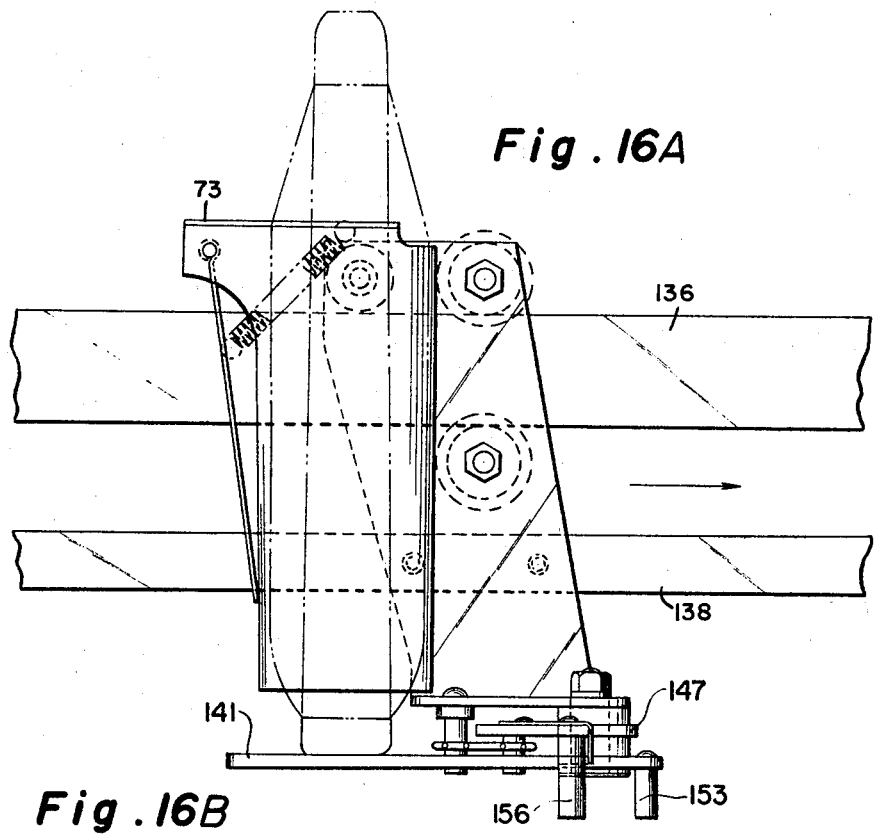
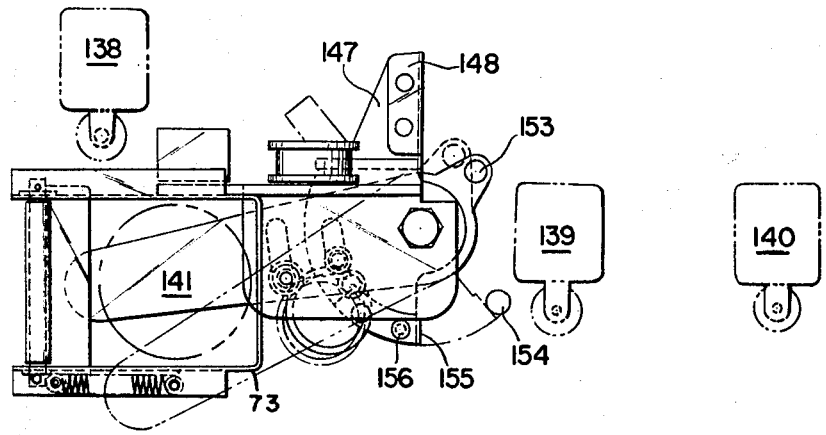

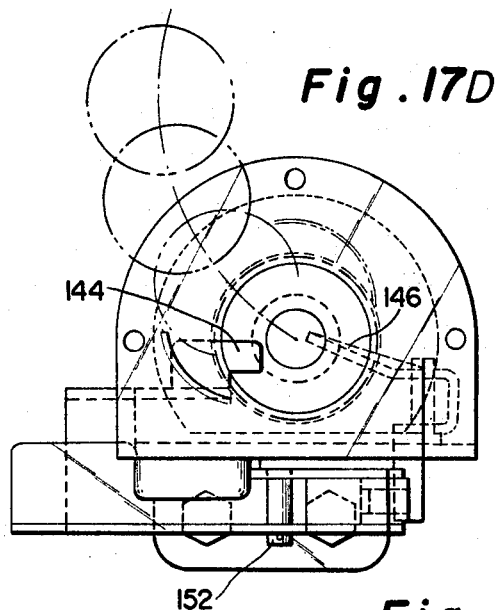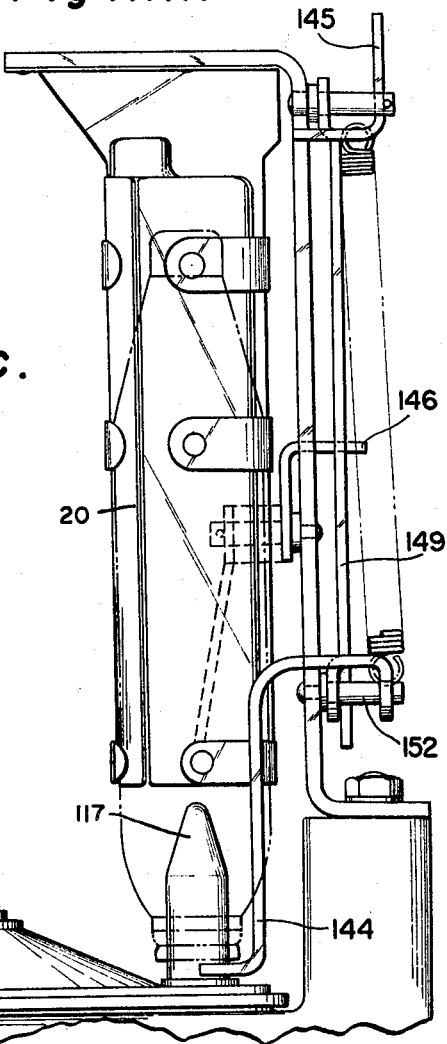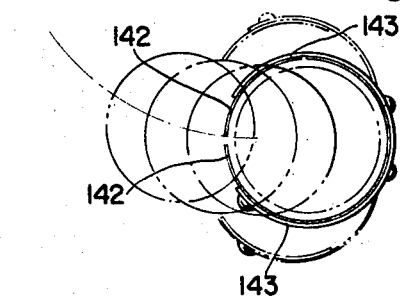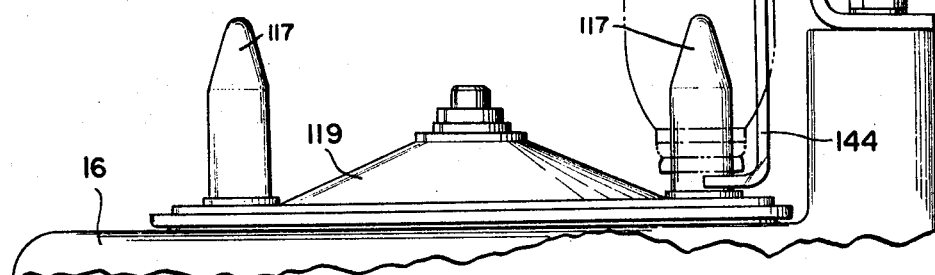

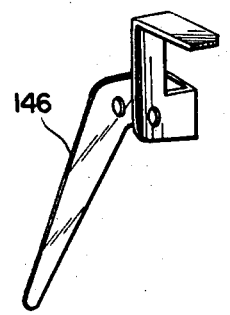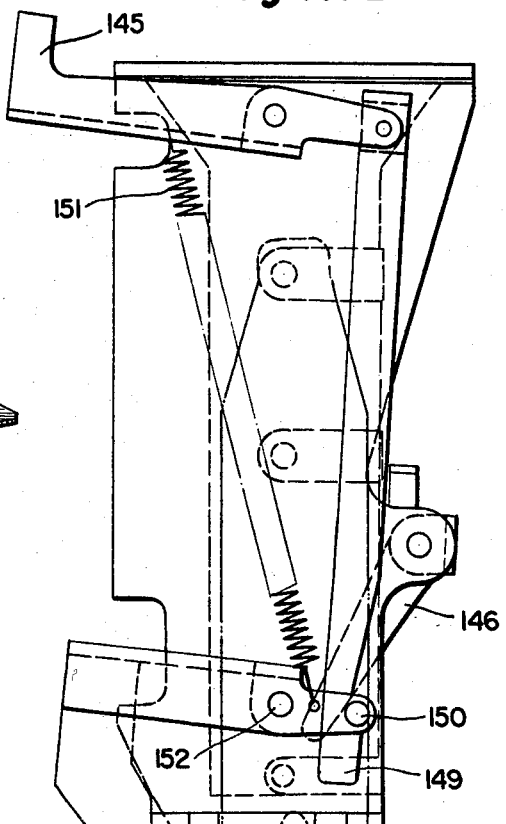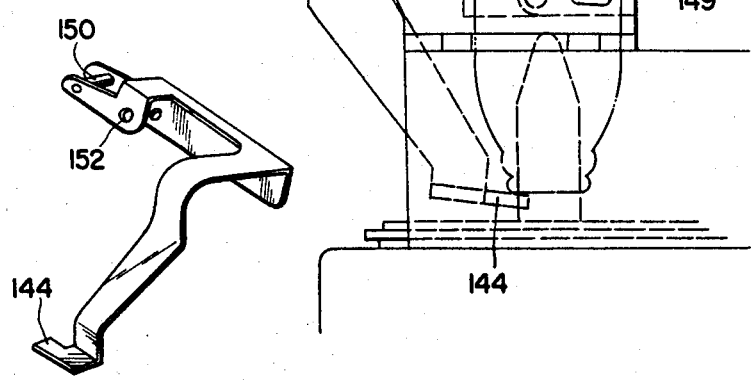

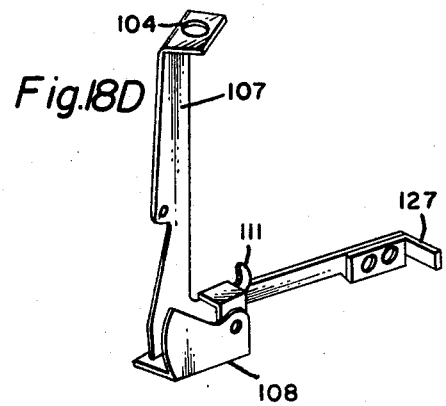
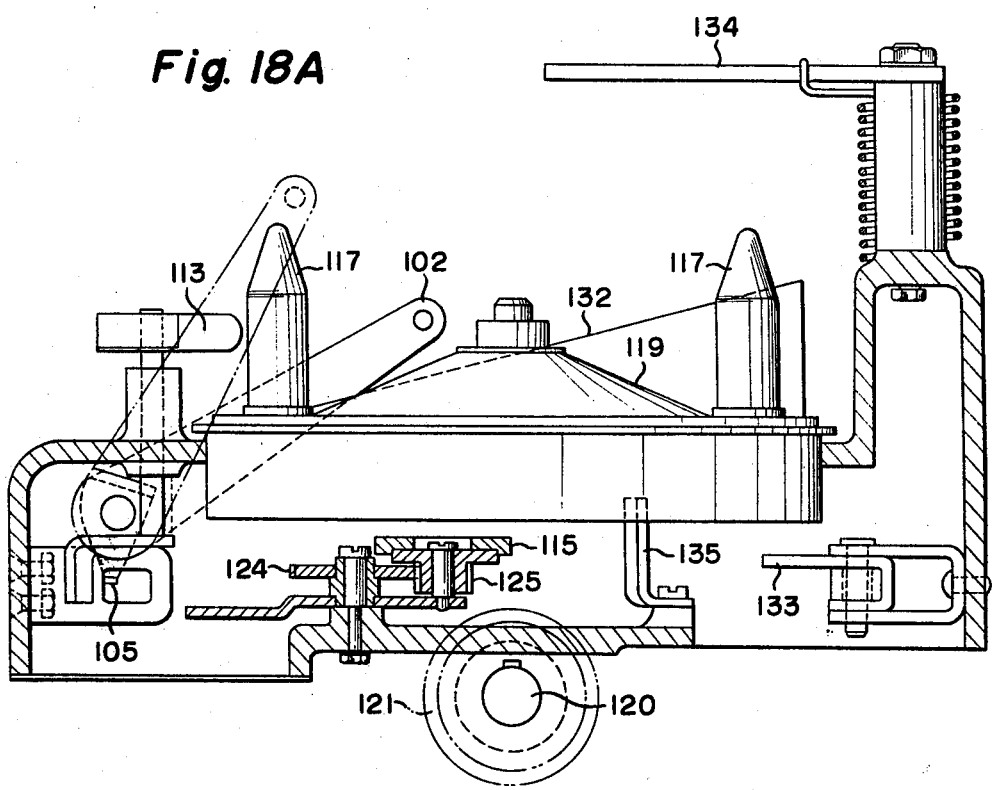

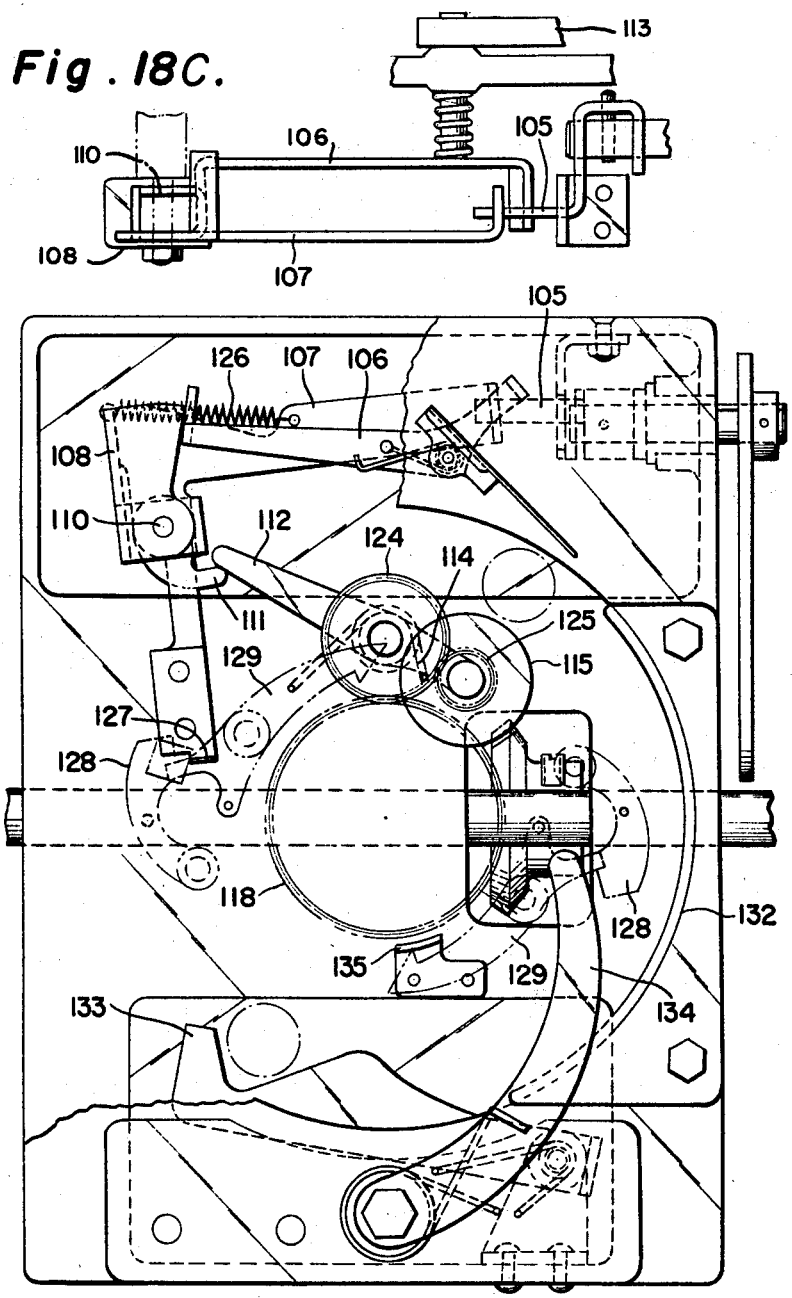

3,399,840
WINDING MACHINE FOR WINDING YARNS
OR THE LIKE MATERIALS INTO CHEESE
OR CONES
Junichi Hayashi, 167 2-chome Kofuen, Nishinomiya-shi,
Hyogo-ken, Japan, and Shin Tsukuma, 7–13 Sakura-
gaoka, Itami-shi, Hyogo-ken, Japan
Filed May 21, 1964, Ser. No. 369,064
8 Claims. (Cl. 242—35.5)

ABSTRACT OF THE DISCLOSURE

A winding machine having a plurality of winding units with each unit having automatic means for retrieving yarn ends from the takeup package and the supply cop and knotting them together. A spare cop reservoir is provided for each winding unit, and cop supplying means are provided for supplying cops to the spare cop reservoir.

---

This invention relates to a winding machine for winding yarn or like materials into cheeses or cones which are commonly referred to as packages.

A principal object of the invention is to provide a fully automatic winding machine equipped with an automatic supply cop distributing device requiring no attention of the operator during its normal operation except for taking-off the fully wound package and supplying empty tubes to a tube holder.

Another object of the invention is to provide a winding unit which is assembled in multiple on a bed or other support with each unit having automatic mechanism such as means for retrieving yarn ends from the package and from the supply cop, knot-tying means for uniting said yarn ends and a program cam which controls the above mentioned automatic mechanism when the yarn on the supply cop breaks or is exhausted.

Another object of the invention is to provide means for automatically delivering supply cops from a cop box disposed at the off-end of the machine to cop pockets secured to a V-belt which moves around the machine.

Another object of the invention is to provide means for automatically distributing the supply cops from the cop pockets to the spare cop reservoir when the reservoir becomes empty.

Another object of the invention is to provide means for shifting supply cops from the spare cop reservoir to the winding position when the yarn on the supply cop is exhausted.

Another object of the invention is to provide means for rotating the package in the reverse direction by reverse rotation of the winding drum during the end-finding operation.

Another object of the invention is to provide each unit of the type indicated with a movable suction nozzle for retrieving a yarn end from a yarn package. The nozzle is disposed far from the winding drum and the package during winding operation and approaches the package when the yarn on the supply cop breaks or is exhausted for retrieving the end of the yarn on the package.

Another object of the invention is to provide winding units having a stationary suction pipe provided with a slit for retrieving the yarn end from the supply cop by the combination of the action of air and the rotation of a supply peg which rotates in the unwinding direction of the yarn on the cop when the yarn on the supply cop breaks or the supply cop is replenished.

Another object of the invention is to provide means for detecting whether yarn remains on the supply cop or is exhausted and for replenishing a supply cop when exhausted.

Another object of the invention is to provide means for repeating the operation of end-finding and knot-tying if the initial operation fails to properly unite the two ends of the yarn so as to insure against misses in the automatic winding.

Another object of the invention is to provide a program regulating cam as an automatic control mechanism which actuates when the yarn on the supply cop breaks or is exhausted and carries out a series of control actions in timed sequence, namely; the stopping and reverse rotation of a driving drum, end-finding operations both from the package and the supply cop, the replenishing of the supply cop when its yarn is exhausted, the rotation of the peg for the supply cop, the opening of slub catchers and tension discs, knot-tying and restarting the winding operation.

Further objects of the invention are set forth in the following specification which describes a preferred form of construction of the winding machine by way of example as illustrated in the accompanying drawings, wherein:

FIG. 6 is a partial sectional view of a program cam, showing the positioning of the latch during its operation and when the feeding yarn breaks or is exhausted;

FIGS. 7A, 7B and 7C are partial sectional views of a slide pinion and a gear shifter.

FIG. 8 is an elevational view of program cams and the slide pinions in the box of the stop motion device;

FIG. 9 is a partial sectional view of a program cam, showing the mechanism for opening and closing the tensioning discs and for operating the supply cop replenishing device;

FIG. 10 is a partial sectional view of a program cam, showing mechanism for advancing a suction nozzle to retrieve a yarn end from the package and thereafter retracting the suction nozzle from the package;

FIGS. 16A, 16B and 16C are an elevation, plan and perspective view respectively of a cop supplying unit showing its construction;

FIGS. 17A, 17B, 17C, 17D, 17E and 17F are elevational plan and detail views of a spare cop reservoir, showing its construction;

FIGS. 18A, 18B, 18C and 18D are sectional, plan and detail views of a cop shifting device, showing its construction;

*Main elements of the winding unit*

The present invention comprises, in general, a winding unit having a helically grooved driving drum for rotating a package 1 by surface contact therewith and simultaneously traversing the yarn longitudinally thereof, and in addition thereto, the winding unit is provided with a tension device for providing tension to the yarn to be wound onto the package; slub catchers for cleaning the yarn; end-finding means for retrieving yarn ends from packages and supply cops; a knot-tier for uniting the yarn ends from the package and the supply cop; means for transferring yarn ends to the knot-tier; means for ejecting the united yarn, means for guiding said yarn to the tension device and the slub catcher to form a correct winding line, and means for shifting the cops in the spare cop reservoir to the winding position. The machine also is provided with means for delivering supply cops to the spare cop reservoir of each winding unit.

*General arrangement of the machine*

Figure 1:
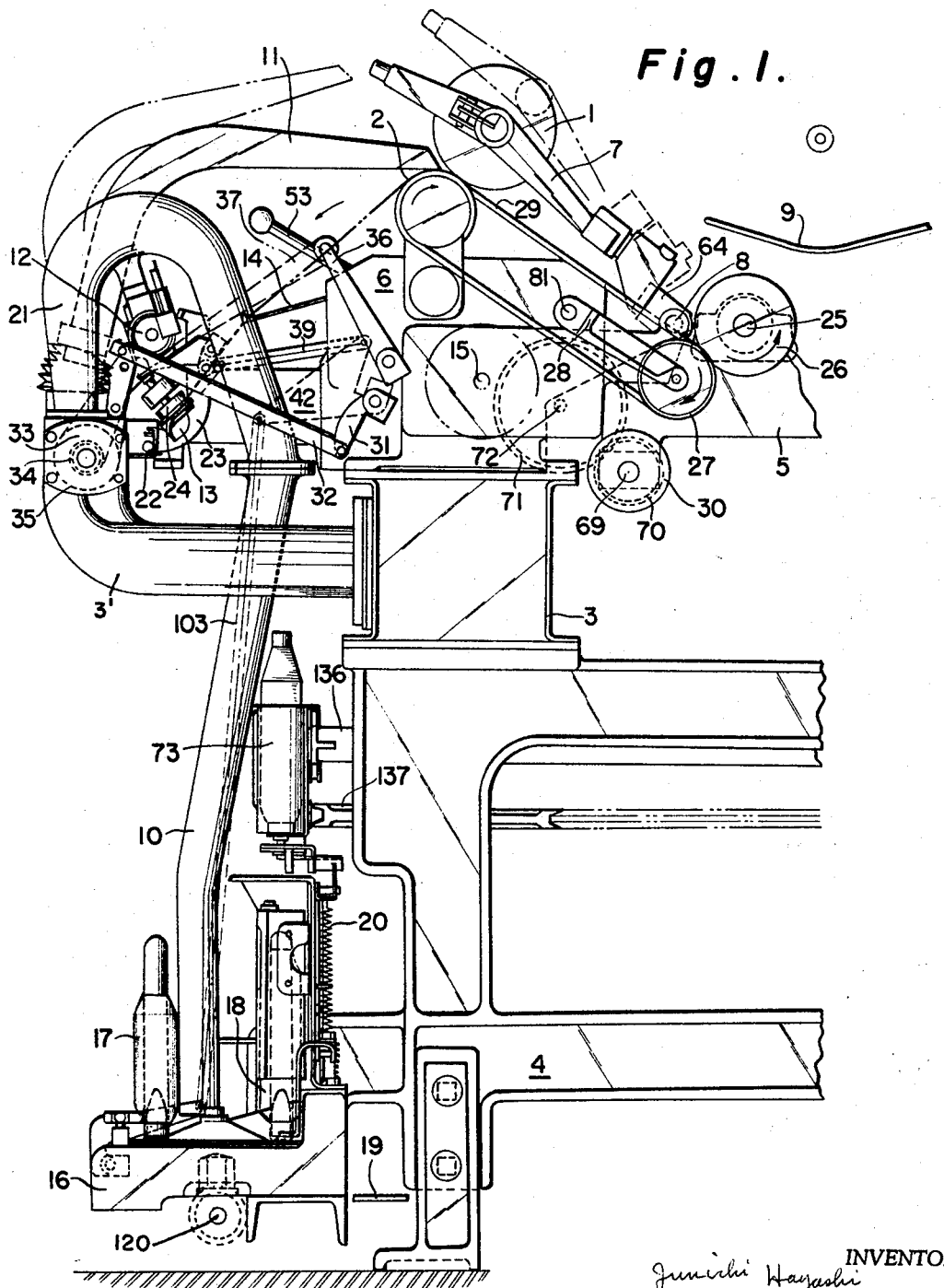
FIG. 1 is an elevational side view illustrating the winding units of the machine shown in their operative relationship and mounted on a bed which is supported from the floor by spring pieces or legs.

Referring to FIG. 1, any suitable number of individual and independent winding units, for example six, may be arranged at fixed intervals along each side of a bed 3. The bed 3 may be constructed of iron plates or cast iron and serve as an air duct as well as the bed to provide the frame work for supporting the units. Driving shaft brackets 5 disposed on the bed 3 support driving shafts 25 and 69 which extend the entire length of the machine and are driven continuously by a suitable power source such as an electric motor enclosed in a gear casing. A driving drum 2 on each winding unit is driven independently by a V-belt 29 engaging a pulley 27 which is rotated by frictional contact with a pulley 26 secured to the driving shaft 25 which rotates counter-clockwise. Each unit has a pinion 70 secured to the driving shaft 69 which rotates clockwise and a larger gear 71 which meshes with the pinion 70 and drives a box shaft 72. The reverse rotation of the driving drum 2 is performed by means of contacting a pulley 30, secured to the drive shaft 69 with the pulley 27 when the yarn on the supply cop breaks or is exhausted. A movable suction nozzle for retrieving a broken end from the package and stationary suction ducts 10 and 21 for retrieving a yarn end from the supply cop are connected with the bed 3 which is the main duct for suction air generated at the gear end of the machine by a suitable means such as an electric blower through a branch duct 3. A supply cop delivering device has many cop pockets 73 fixed on a V-belt 138 (FIGS. 15A and 15B) and is driven by a suitable power source such as an electric motor encased in the gear end, not shown, by pulley 137. With the exception of the three driving shafts 25, 69 and 120 (shown in FIGS. 18A and 19A) the supply cop delivering device, an empty bobbin conveyor, the full package conveyor and all winding mechanisms act individually and independently.

*The winding unit*

As illustrated in FIG. 1, each winding unit of the machine has its respective driving drum 2, which has helical grooves to traverse the yarn from one end of the package to the other in a well known manner. The package 1 is driven by peripheral contact with the driving drum and the yarn is wound on a conical or cylindrical tube which serves as a core for supporting the yarn mass. The core is held suitably on a bobbin holder 7 which is supported by a pivoted arm 64. The weight of the bobbin holder assembly applies pressure to the package against the driving drum during operation. The bobbin holder 7 is rotatably mounted on a pivoted arm 8 to adapt the holder to swing upwardly and permit the package to recede from the driving drum during the build-up of the yarn on the core. Thus, the contact pressure of the package against the driving drum is maintained almost constant in spite of increase in the weight of the package. The package always contacts with the driving drum even when the yarn on the supply cop breaks or is exhausted, until the package reaches its predetermined diameter. The driving drum 2 is driven independently by V-belt 29 on the pulley 27 which contacts with the pulley 26 fixed on the driving shaft 25. The reverse rotation of the driving drum 2 is performed by means of contacting the pulley 30 with the pulley 27 when the yarn on the supply cop breaks or is exhausted.

*Tension device*

Figure 2:
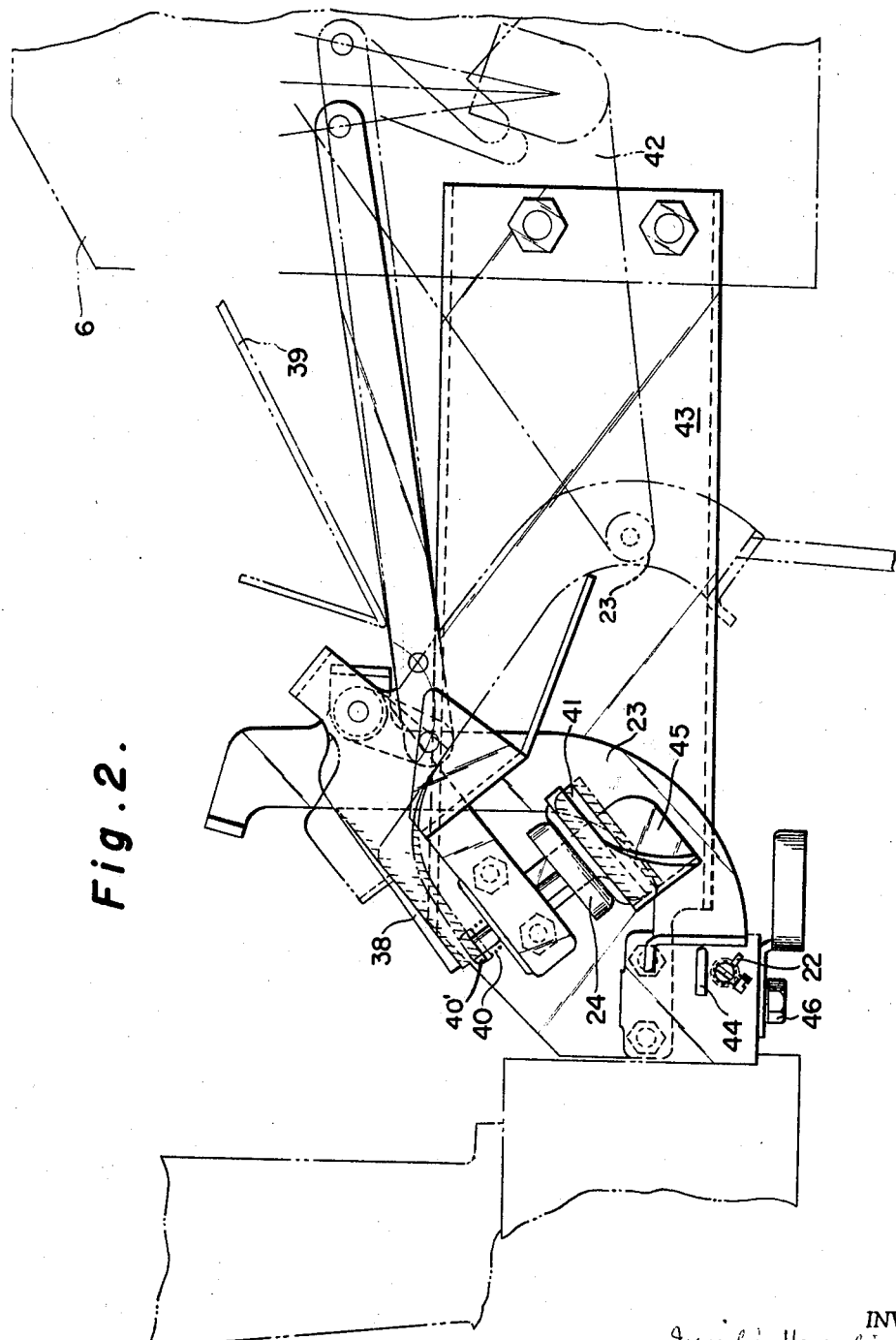
FIG. 2 is an elevational side view of a tensioning device.

As illustrated in FIG. 2, the tension device comprises the usual concave-convex disc 24 rotatably mounted on a pin and a slub catcher which consists of a comb 22 and a guide piece 23. FIG. 2 shows the position of this device during operation. When the yarn on the supply cop breaks or is exhausted, a tension lever 42 pulls a link 39 by the action of a program cam, so that the guide piece 23 shifts its position to the dotted line position. The guide piece 23 pushes a lever 38 downward. The lever 38 pushes the head of a disc pin 40' against a spring 40 and this opens the tension discs to permit easy threading for a new supply yarn.

When winding restarts, the link 39 is repositioned in the position shown in full lines by action of the lever 42, and the guide piece 23 swings down to a guide piece stopper 44. The yarn is united by the knotting device 12 and is guided by the curved surface of a cap guide 45 to the tension discs and the slub catcher. A regular winding line of yarn is thus formed.

The guide piece 23 has a flat surface at one side which consists of the slub catcher combined with the comb 22. As mentioned above, when the yarn on the supply cop breaks or is exhausted, the comb 22 of the slub catcher and the tension discs 24 are opened so that these parts are effectively cleaned.

*Package sizing mechanism*

Figure 3:
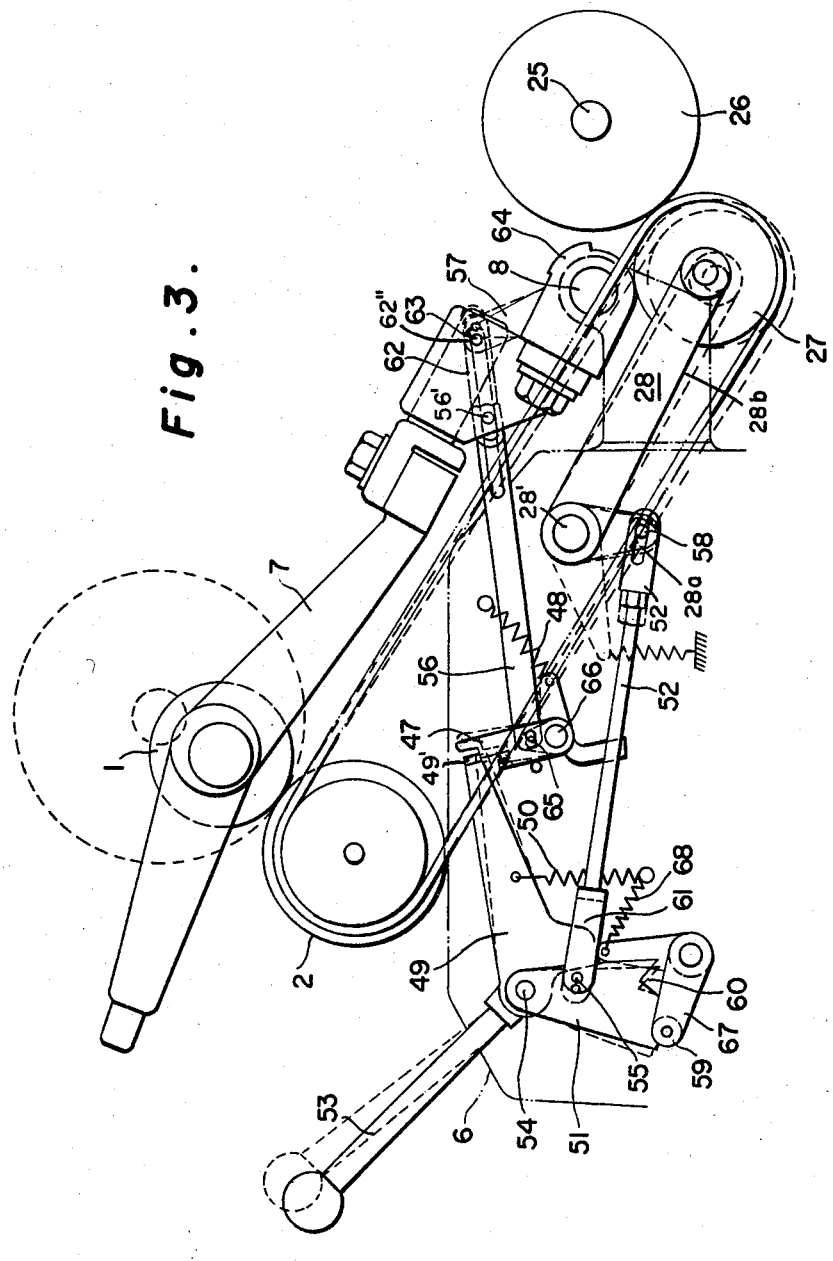
FIG. 3 is an elevational side view of a sizing gauge, showing its mechanism.

The package sizing mechanism of this machine is illustrated in FIG. 3. With the exception of a link 56, the entire mechanism of this device is built in a cam box 6. As the yarn is wound on the package, the bobbin holder 7 supported by the pivoted arm 64 swings upwardly according to the increase in diameter of the package. To arrest winding operation when the package reaches its predetermined diameter, the friction pulley 27 is slightly disengaged from the main driving pulley 26 by the operation of means described below. The link 56 is provided with an adjusting piece 62 having a longitudinal slot 62' which slidably engages with a pin 63 secured to an arm 57 of the pivoted arm 64, and the other end is pivotably secured to a supporting piece 47 which is pivotably secured to a pivot 66. A rotating plate 49 is pivotably secured to a pivot 54 rigidly secured to a top portion of a roller rest 51 and has an end portion 49' which rests on a top portion of the supporting piece 47. When the diameter of the package becomes a predetermined dimension, the pin 63 pulls the link 56 and the rotating plate 49 drops from a top end of the supporting piece 47. The plate 49 is thereby freed to rotate clockwise under action of a spring 50 and a kick piece 61 on the plate kicks a pivot pin 55 of the roller rest 51 causing the roller rest to rotate clockwise. Hence roller 59 of a roller lever 67 enters a notch 60 of the roller rest 51. A link 52 is pivotably secured to the pivot pin 55 at one end and is provided at the other end with a slotted piece 52' which engages with a pin 58. A friction pulley arm 28 is formed as a bell crank lever pivoted at the pivot 28' and the pin 58 is secured at a bottom end of one arm 28a while the pulley 27 is rotatably carried at the end of the other arm 28b of the friction pulley lever 28. The link 52 acts to move the friction pulley arm 28 through the pin 58 and thus the friction pulley 27 is disengaged from the main driving pulley 26 and the winding operation stops. To regulate the size of the package as desired, the adjusting piece 62 is engaged as will presently be described.

The adjusting piece 62 is clamped in adjusted position on the link 56 so that when the arm 57 carrying pin 63 turns clockwise according to the clockwise turning of the bobbin holder 7 around the pivot shaft of the arm 8, pin 63 contacts with the far end portion 62" of the slot 62' of the adjusting piece 62. Upon further increase in diameter of the package after the pin 63 contacts the end 62" of the slot 62' of the adjusting piece 62, the link 56 is moved in a right hand direction by the counterclockwise turning of the arm 57 carrying the pin 63, and when the diameter of the package becomes a predetermined value, the link 56 rotates the supporting piece 47 around a pivot shaft 66, in a clockwise direction to disengage the supporting piece 47 from end portion 49' of the rotating piece 49. Consequently, the rotating plate 49, roller rest 51, link 52 and friction pulley lever 28 are displaced to the position shown by dotted lines, and the friction pulley 27 becomes disengaged from the driving pulley 26, whereupon the winding operation is stopped.

Therefore, the package size can be adjusted by changing the length of the slot 62'. The length of the slot 62' can be adjusted by changing the connected position of the adjusting piece 62 with the link 56 by a fastening bolt 56'.

The restarting of the winding operation is accomplished by removing the fully wound package, inserting an empty tube into the bobbin holder 7 and manually pushing downwardly a handle 53.

*Automatic control of mechanism by the program cam*

Referring to FIGS. 1, 4, 5, 6, 7A, 7B, 7C, 8, 9, 10, 11, 12 and 13, the driving shaft 69 supported by the shaft bearing bracket 5, is driven continuously by a suitable driving means encased in the gear-end casing and drives the cam shaft 72 of the cam box 6 by the pinion 70 engaged with the large gear 71 secured to the shaft 72. A cam 73 which is secured to the shaft 72 is a main control element of this automatic control mechanism.

The cam 73 rotates continuously counterclockwise and provides toggle motion to the lever 74 which is pressed against the cam 73 by a spring 77. During this operation, a feeler wire 14 (FIG. 6) is held in position under the yarn passage by the yarn tension and a latch 75 is held up by a hook 76. The latch 75 is pivoted on a supporting shaft 78 and has a notch 75'.

Figure 4:
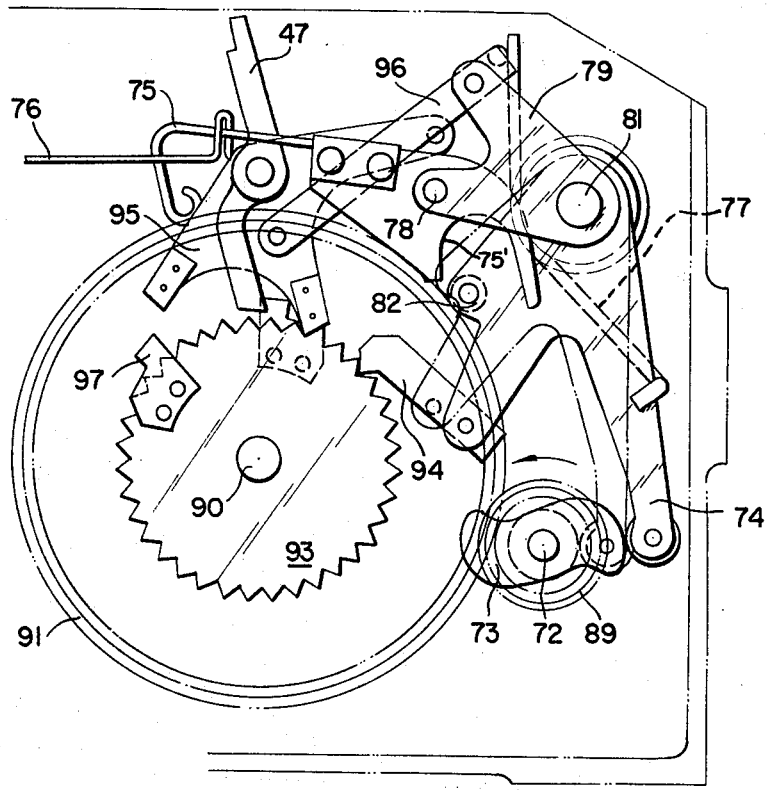
FIG. 4 is a partial sectional view of a latch mechanism of a stop motion device.

As illustrated in FIG. 4, the latch 75 is not affected by the movement of the lever 74 and a roller 82 which moves in and out of the notch 75' of the latch 75 during operation. When the yarn on the supply cop breaks or is exhausted, the feeler wire 14 springs upwardly and the latch 75 changes its position as indicated in FIG. 5 and consequently the roller 82 pushes upwardly the left side edge of the notch of the latch 75 and a supporting piece 79 changes its position as indicated in dotted lines in FIG. 5.

Figure 5:
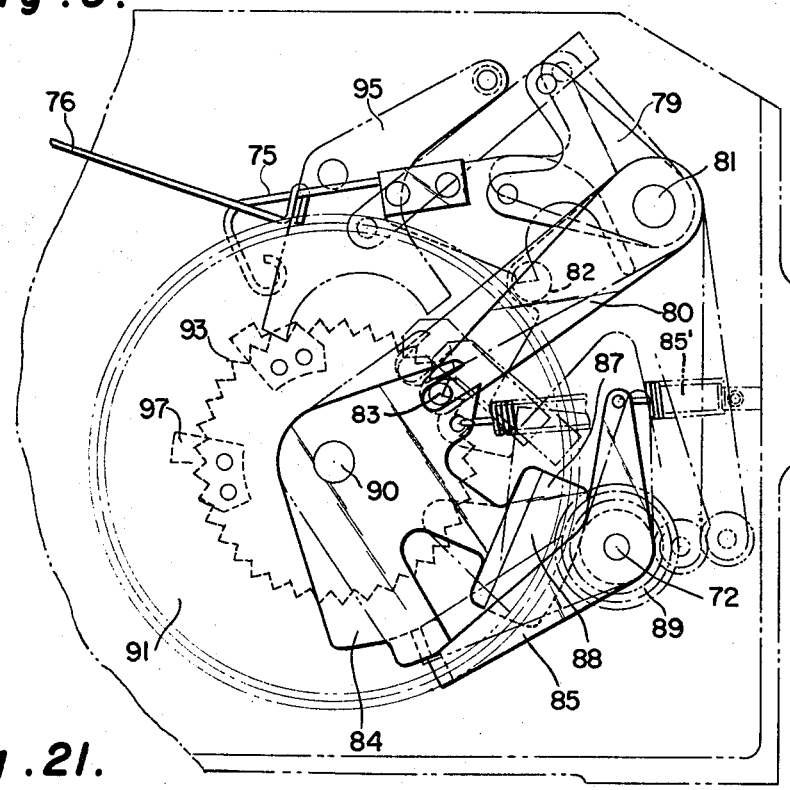
FIG. 5 is a partial sectional view of the latch mechanism and a slide pinion in the operating condition of the mechanism when the stop motion device operates.

As the supporting piece 79 and a lever 80 are secured to a lever shaft 81, the lever 80 also changes its position as indicated in dotted lines in FIG. 5 and as the pin 83 disposed at the edge end of the lever 80 is engaged with a slot of a gear shifter 84, the movement of the lever 80 with pin 83 actuates the gear shifter 84 to swing counterclockwise and a hook 85 which is loosely connected with the cam shaft 72 drops into the lower step of the gear shifter 84 by the action of a spring 85' as indicated in dotted lines in FIG. 5.

The gear shifter 84 is provided with an inclined shifter cam 88 in such a way that the cam surface of the shifter cam 88 is inclined to the axis 84' of the gear shifter 84. The inclined shifter cam 88 meshes with the V-shaped groove of a slide gear 89 slidably attached to the cam shaft 72. When the gear shifter 84 rotates, the slide gear 89 is slid along the cam shaft 72 by the inclined shifter cam 88 which is turned with the gear shifter 84, and engages with a large gear 91 secured to shaft 90 of a program cam assembly A–F (FIG. 8). The program cam thereupon starts its action. The program cam assembly consists of six plate cams A–F which are secured to the program cam shaft 90, and the relative position of each cam is maintained by a suitable arrangement. The arrangement of these cams is shown in FIG. 8 and the shape and relative position of each cam on the program cam shaft 90 is shown in FIGS. 6, 9, 10, 11, 12 and 13. The programming cam assembly is provided with cams for effecting the reverse rotation of the driving drum 2; movement of the suction nozzle 11; retrieving the yarn ends both from the package and the supply cop; the opening and closing of the tension discs and the slub catcher 22, the knot-tying, etc. while the cam shaft 90 revolves once. The detailed illustration of each of the above mentioned motions are explained hereinafter.

*Means for retrieving the yarn ends from the package*

Referring to the FIGS. 1, 6, 10, 11 and 13, means for retrieving the yarn end from the package comprises the suction nozzle 11, means for reverse rotation of the driving drum 2, means for transferring the retrieved yarn end to the knot-tier 12 and the program cam C which controls relative motion of the above means.

When the yarn on the supply cop breaks or is exhausted, the feeler wire 14 springs upwardly and this motion actuates the latch 75 in the cam box and the program cam commences its action as illustrated in FIG. 5, and described above. The pulley 27 is rotatably mounted on an end of the pulley arm 28b of lever 28. The other end of the pulley arm 28 is pivotably secured to a pivot shaft 81. The pulley 26 is rigidly secured to the main driving shaft 25 which rotates counterclockwise and the pulley 30 is rigidly secured to the shaft 69 which rotated clockwise. The V-belt 29 provides a driving connection between the driving drum 2 and the pulley 27 so as to transmit the rotation of the pulley 27 to the driving drum 2 and the pulley 27 so as to transmit the rotation of the pulley 27 to the driving drum 2. When the yarn on the supply cop breaks or is exhausted, the feeler wire 14 springs upwardly and the latch 75 acts to swing the pulley arm 28 in a clockwise direction. Therefore the driving contact of pulley 27 with the pulley 26 is converted to that with the pulley 30 on the shaft 69 which runs continuously in an opposite direction to the main driving shaft 25, that is, the driving drum 2 rotates counterclockwise. Therefore, the winding operation is stopped at the same time the driving drum 2 drives the package in the unwinding direction thereof during the end-finding operation.

When the package begins to rotate reversely, the suction nozzle 11 is swung down to the package from the far position by the motion of program cam B which actuates a lever 31 and a link 32 as shown by dotted lines in FIG. 10. The suction nozzle 11 has a sector shaped mouth which extends the full length of the package so as to be able to retrieve the yarn end anywhere on the package.

Figure 20:
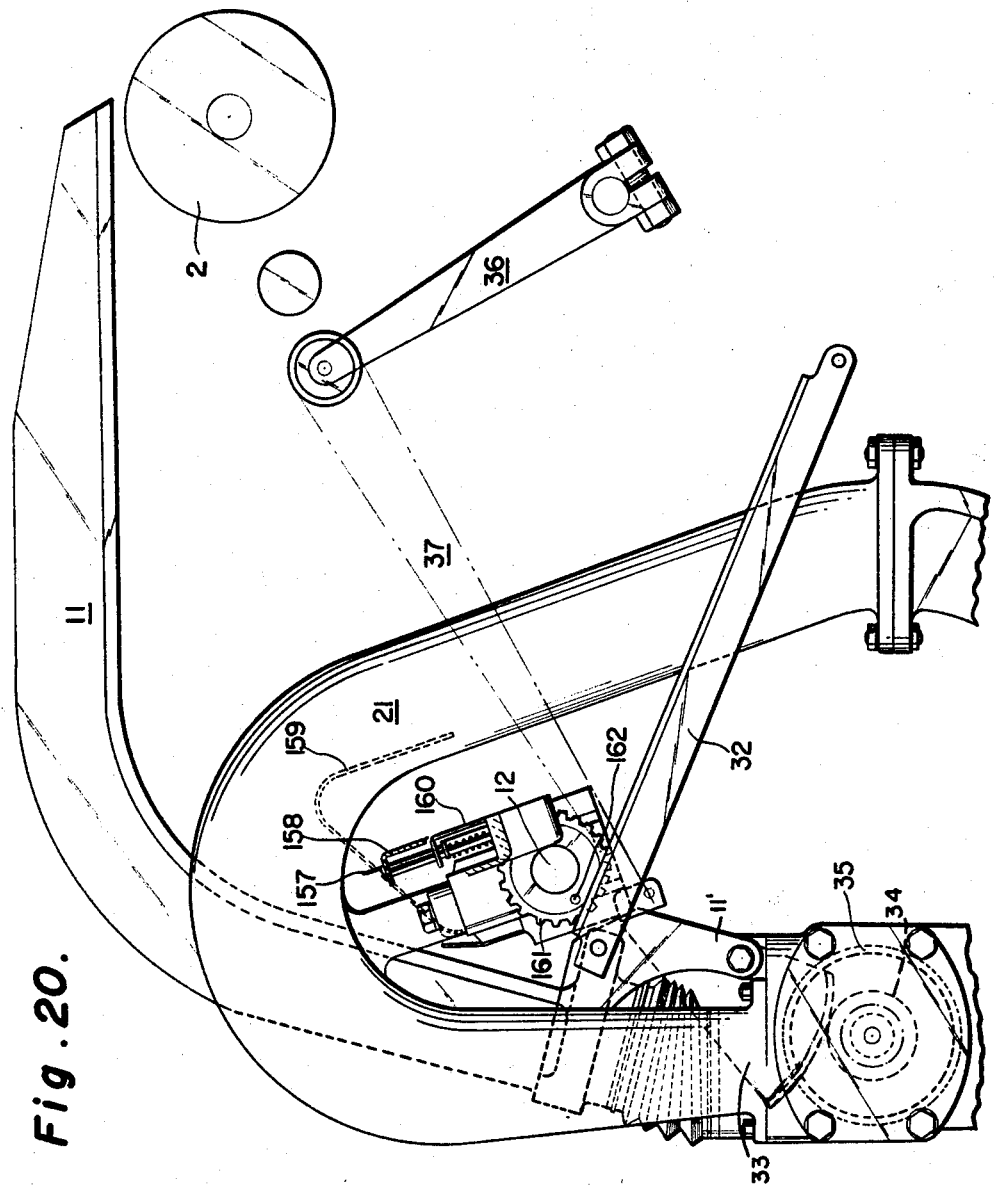
FIG. 20 is a side elevational view of a knot-tier showing its relative position to the suction nozzle and the suction pipe.

A suction valve 35 is disposed under the suction nozzle 11 and a gear 34 is secured coaxially to the suction valve 35 so as to open and close the valve. A rack 33 is secured to a pivot arm 11' of the suction nozzle 11 and meshes with the gear 34 so as to turn the gear 34 and open and close the suction valve 35 in accordance with the motion of the suction nozzle 11, as shown in FIGS. 1 and 20.

Two suction pipes are installed on the suction valve 35. One is the suction nozzle 11, and the other is the suction pipe 21 with its extension guide duct 10. When the suction valve 35 opens, the suction nozzle 11 retrieves the yarn end from the package while the suction pipe 21 retrieves the yarn end from the supply cop through its extension guide duct 10. The yarn retrieved by the suction nozzle 11 is unwound from the package with traverse motion.

Figure 14:
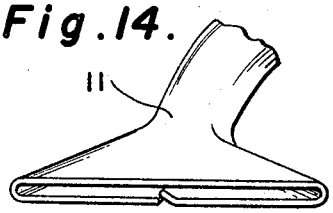
FIG. 14 is a perspective view of a suction nozzle, showing the construction of its mouth.
Figure 11:
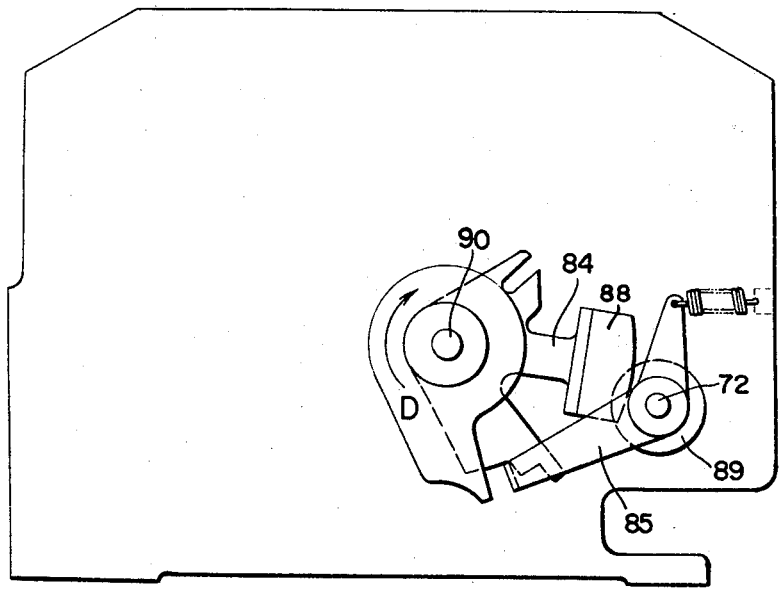
FIG. 11 is a partial sectional view of a program cam, showing mechanism for repositioning the slide pinion.

The sector shaped mouth of the suction nozzle 11 has a slit at the center of its lower side and the one side edge of the slit is bent inwards as shown in FIG. 14 so as to easily eject the retrieved yarn outwardly. As the suction nozzle 11 recedes from the package, the suction valve 35 closes and the retrieved yarn from the package is ejected from the slit and is transferred to the knot-tier 12, while the other yarn end from the supply cop is also transferred to the knot-tier 12.

The series of motions described above is related to the control mechanism of the program cams which are shown in FIGS. 6, 10, 11 and 13 and explained above in the section on the program cam.

*Means for retrieving the yarn end from the supply cop*

Referring to the FIGS. 1, 6, 9, 10, 11, 13, 18A, 18B, 19A and 19B, means for retrieving the yarn end from the supply cop comprises a suction pipe 21 having an extension guide duct 10, a turn table 119 (FIG. 19A) and the program cam A which controls the relative motion thereof. The guide duct 10 is provided with a slit extending along an edge of the duct.

On a turn table 119, two supply pegs 117 are rotatably fixed in symmetrical arrangement. One of these is for the working cop and the other is for the waiting cop. The peg for the working cop has a position near the suction guide duct 10 so as to suck the yarn end easily from the supply cop easily.

When the yarn on the supply cop breaks or is exhausted, a detection plate 113, which always touches the supply cop, detects whether the yarn on the supply cop is exhausted or not and if it is exhausted, the supply cop is replenished. If yarn still remains on the cop the suction guide 10 retrieves the yarn end from the cop, as illustrated in the following description.

The detection plate 113 is firmly secured to a crank lever 106 and both are biased clockwise by a spring 113' and at the same time are supported by a crank lever 105. When the supply yarn breaks, winding operation stops and program cam A actuates a link 103 of the lever 42 so as to pull a lever 102 to actuate the crank lever 105 and a moving lever 107 as shown in FIGS. 9 and 18B. Then, in accordance with action of the crank lever 105, the crank lever 106 and the detection plate 113 are moved by the spring 113'. However, their movement is hampered by the remaining yarn on the supply cop and consequently the crank lever 106 does not disengage from the sector part of a stopping lever 108. However, movement of a tip 111 of the moving lever 107 actuates a lever 112 by means of a spring 114 to push a friction wheel 115 so as to contact with a peg roll 16 which is disposed on an extended under part of a peg 117 and thereby rotate the supply cop on the peg 117. The peg 117 rotates in the unwinding direction of the yarn on the cop to easily retrieve the yarn end through the slit of the suction guide duct 10. The friction wheel 115 is driven continuously by a bevel gear 121 which is secured to the shaft 120 and carries the peg 117 which is rotated by the above mechanism only when the yarn remains on the cop.

When the yarn on the cop breaks or is exhausted, the suction valve 35 is opened by the program cam B, so that the retrieving of the yarn end from the supply cop by the suction guide duct 10 commences just after the yarn on the empty cop breaks or is exhausted in accordance with the motion for retrieving the other end from the package as explained in the preceding section.

During the winding operation, the supply yarn may be broken at the slub catcher 22 by a slub, knot, etc. and at the weaker point of the yarn by tension and other factors such as unwinding resistance. Consequently the broken yarn end does not always remain at the location of the tension device or the slub catcher. The invention relating to this means therefore is a most remarkable feature in that it can retrieve the supply yarn end anywhere, whether it remains on the tension device or on the supply cop itself.

In most automatic winders, the retrieving mechanism is designed on the assumption that the broken yarn end always remains on the tension device or the slub catcher, so if the yarn is broken near the supply cop, the means for retrieving the yarn end from the supply cop does not work. Therefore, the present invention provides an important improvement in automatic winding.

*Automatic knot-tying device*

Figure 21:
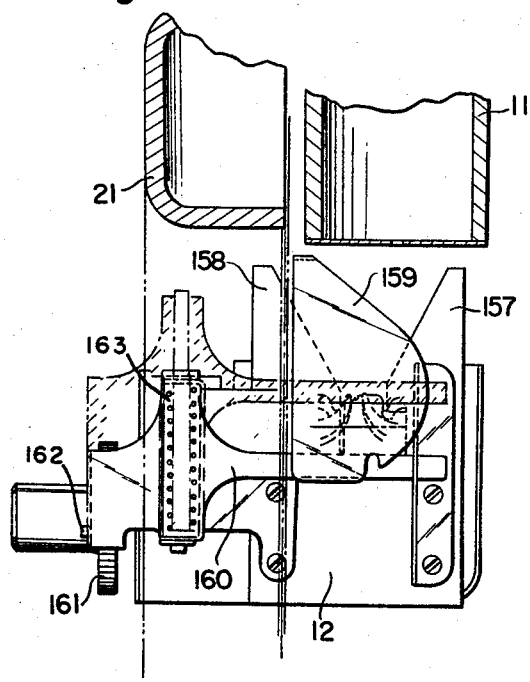
FIG. 21 is an elevational view of the knot-tier and its yarn guide showing the direction of the retrieved yarns carried to the knot-tier.

Referring to FIGS. 1, 20 and 21, the knot-tier for uniting the end of the yarn from the package with the end of the yarn from the supply cop may be of any type having suitable guide plates and is disposed on the fixing boss as shown in FIGS. 1 and 20.

When the yarn on the supply cop breaks or is exhausted the program cam B actuates the suction nozzle 11 through the link 32 as shown in FIG. 10. As the suction nozzle 11 approaches the driving drum, the suction valve 35 is opened and the yarn ends are retrieved from the package by the suction nozzle 11 and from the supply cop by the extended suction duct 10 of the suction pipe 21, respectively. The suction pipe 21 is provided with a continuous slit which extends to the slit of the suction duct 10. The retrieved yarn ends are ejected from the slits of the suction nozzle 11 and the suction pipe 21 and are transferred to the knot-tier by closing the suction valve 35.

Figure 12:
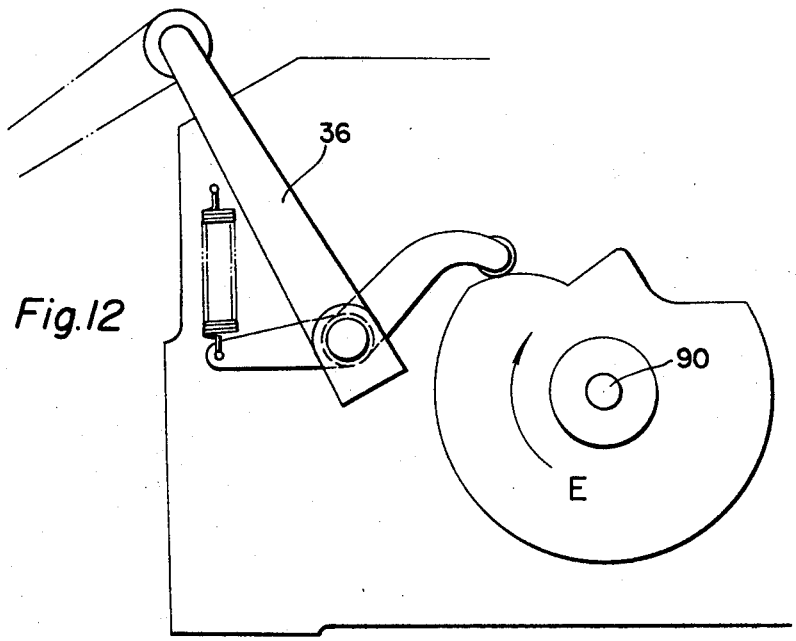
FIG. 12 is a partial sectional view of a program cam, showing the mechanism of a lever motion by which knot-tying is carried out.
Figure 13:
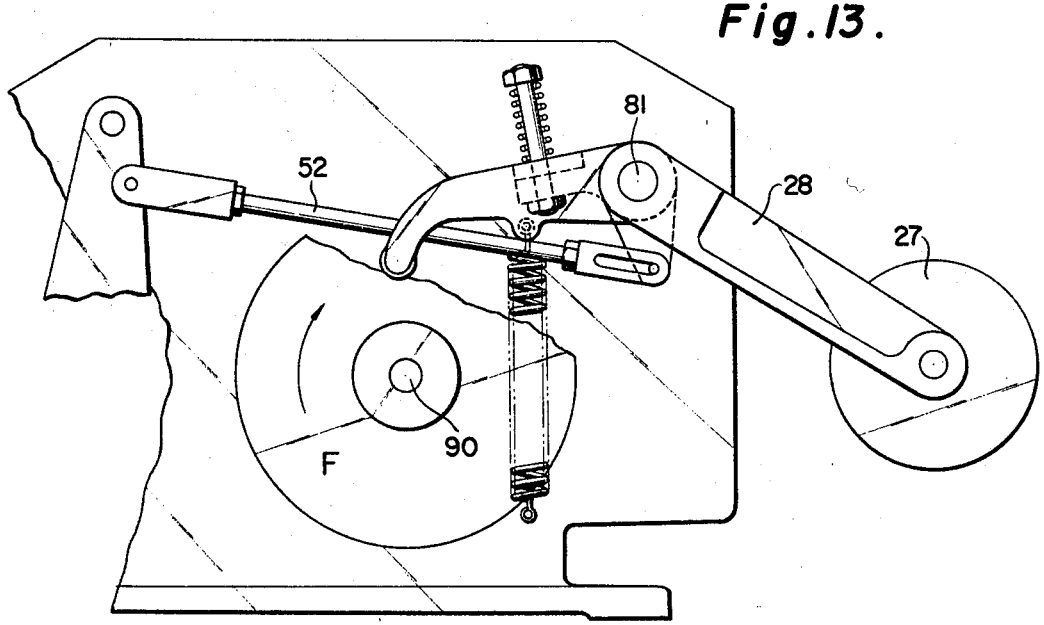
FIG. 13 is a partial sectional view of a program cam, showing the mechanism of a frictional wheel by which the driving drum is caused to revolve in the reverse direction.

The program cam E actuates a lever 36 as shown in FIG. 12 to actuate a wheel 161 of the knot-tier 12 by a timing belt 37. FIG. 21 shows how the yarn ends are transferred to the knot-tier 12 from the slits of the suction nozzle 11 and the suction pipe 21.

The yarn ends are transferred in the direction shown by the arrow through the slits of the suction nozzle 11 and the suction pipe 21 respectively and guided by guide plates 157, 158 and 159 to the correct position on the tying head. The wheel 161 is actuated by timing of the program E and the two yarn ends are united. The united yarn is ejected from the knot-tier by an ejector bar 160 which is pushed up against a spring 163 by a knock pin 162 on the wheel 161 as the wheel 161 rotates.

*Repeating the end finding and knot-tying operation*

As mentioned above, when the yarn on the supply cop breaks or is exhausted the end-finding and knot-tying means work immediately and the operation is repeated automatically by the program cam C if the first operation fails to properly unite the yarn end from the package with the other end from the supply cop. The motion of the program cam C commences at the time when the feeler wire 14 springs upwardly. Therefore, if the feeler wire 14 does not take a position as indicated in full lines in FIG. 6 because there is no yarn on the feeler wire 14, the program cam C will continue to repeat the same motion.

The invention provides means for actuating an automatic stop motion after the program cam C repeats its motion three times as explained below.

Referring to FIGS. 4 and 5, a pawl 94 is pivotably secured to a pin of lever 74 so as to oscillate around the pin 81. A ratchet wheel 93 is secured on the main cam shaft 90 and the top end of the pawl 94 meshes with a tooth of the ratchet wheel 93 by a toggle motion of the lever 74 during the winding operation. A pawl 95 has a relative position with respect to the ratchet wheel 93 as indicated in FIG. 4 during operation and when the feeding yarn breaks or is exhausted, the hook wire 76 of the feeler wire 14 is dropped and the relative position between the pawl 95 and the ratchet wheel 93 becomes as shown in FIG. 5, thereupon the pawl 94 advances the ratchet wheel 93 tooth by tooth counterclockwise by the toggle motion of the lever 74 until a kick piece 97 kicks the lever 47 of the package sizing to stop the motion. Thus, the motion of the program cam is stopped.

The number of times the motion of the program cam is repeated will be determined by the interrelation among the number of toggle motions per minute of the lever 74, the number of teeth of the ratchet wheel 93 and the r.p.m. of the main cam shaft 90.

*Means for distributing supply cops to the spare cop reservoirs*

Figure 16C:
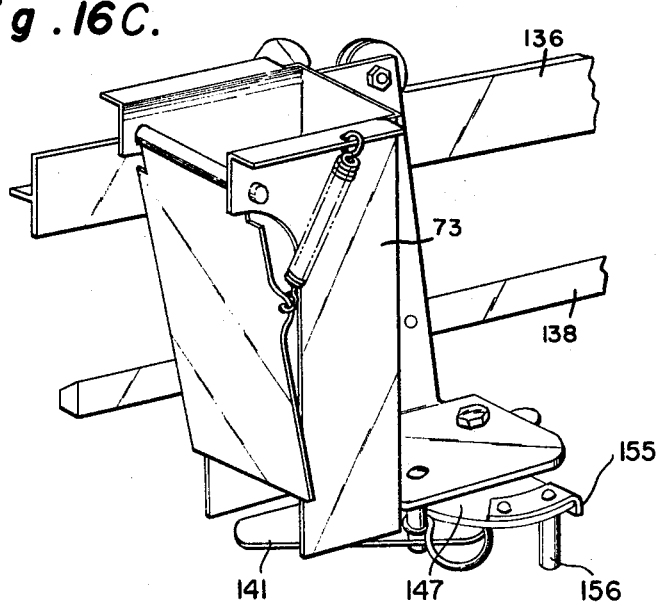

Referring to FIGS. 1, 15A, 16A, 16B, 16C, 17A, 17B, 17C, 17D, 17E and 17F, means for distributing cops to the spare cop reservoirs comprises the endless rail 136 which is secured to a spring piece 4 so as to encircle the machine, the V-belt pulleys 137, the V-belt 138 and the cop pockets 73 which are riveted on the V-belt 138 (FIG. 16A).

The two V-belt pulleys 137 are attached to the spring piece 4 at the off-end side and two other V-belt pulleys 137 are encased in the gear end frame (not shown). One of the V-belt pulleys 137 in the gear end frame is driven by a motor or other suitable means.

A suitable number of the cop pockets 73 are riveted on the V-belt 138 in accordance with the number of winding drums. During operation the cop pockets 73 run above spare cop reservoirs 20 which are disposed under each winding unit. The supply cop which is charged in the cop pocket 73 from the cop charger moves around the machine during operation and feeds its cop to the spare cop reservoir 20 if the spare cop reservoir becomes empty in a manner as described hereinafter.

As indicated in FIG. 16A, a support 141 of the cop pocket 73 supports a supply cop in a position as indicated in full lines and when a cop support 141 changes its position as indicated in dotted line, the supply cop drops into the spare cop reservoir 20. When the supply cop is shifted to the winding position from the spare cop reservoir 20, the turn table 119 rotates half a turn and the peg on the turn table 119 kicks a kicker 144 and a projector 145 linked to the kicker 144 is pushed above the height of the spare cop reservoir 20 as shown in FIG. 17B and thus the projector 145 communicates with the cop pocket 73 which is continuously moving around above the spare cop reservoir 20 so that the spare cop reservoir 20 is emptied.

When the cop pocket 73 loaded with a new supply cop comes to the position of an empty spare cop reservoir 20, an angle plate 148 of a moving plate 147 (FIG. 16B) which is disposed under the cop reservoir 20 collides with the projector 145 and the cop support 141 changes its position as indicated in dotted lines in FIG. 16B. Thus the new supply cop drops into the spare cop reservoir 20.

When the new supply cop drops into the spare cop reservoir 20, the new supply cop pushes out a kick-off lever 146 which is projected into the cylindrical case of the spare cop reservoir 20 when the spare cop reservoir 20 is emptied and the kick-off lever 146 hits a hook bar 149. The hook of the hook bar 149 is disengaged from a pin 150 of the kicker 144 and the projector 145 is moved down by a spring 151. Therefore, when the spare cop reservoir 20 is loaded with a supply cop, the angle plate 148 does not contact with the projector 145 and the cop pocket 73 passes freely on the spare cop reservoir 20.

Figure 15A:
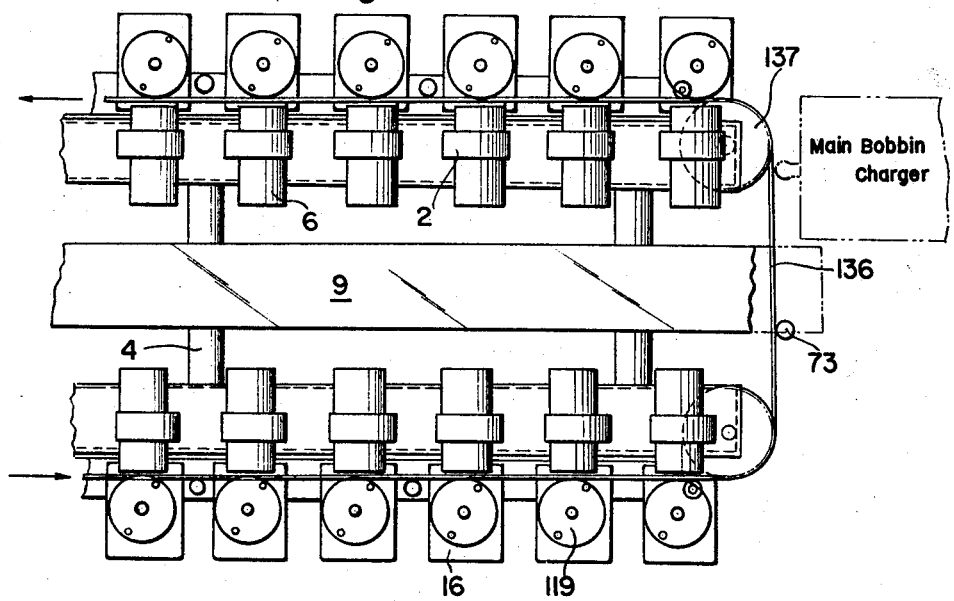
FIGS. 15A and 15B are general views of a cop supplying device, showing its overall construction.
Figure 15B:
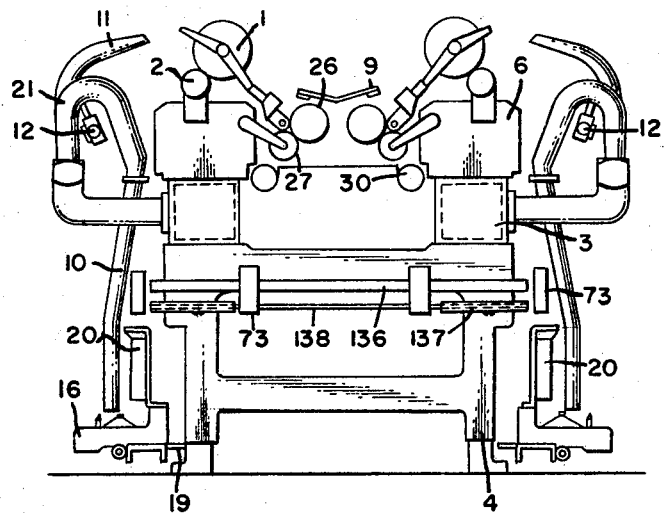

After feeding the supply cop, the cop pocket 73, whose cop support 141 is kept open, continues its movement along an endless rail 136 to the cop charger C in FIG. 15A at the off-end of the winding machine and at the position of the cop charger C, a push rod 153 of the cop support 141 pushes the first switch of the cop charger C to switch on an electric circuit of the charger C and at the same time an angle plate 155 collides with a bar 154 and the cop support 141 is restored to its first position as indicated in full lines in FIG. 16B.

The cop pocket 73 continues its movement and the push rod of the moving plate 147 then pushes the second switch of the cop charger C so as to actuate it to feed a new supply cop to the pocket 73.

The cop pocket 73 continues its movement and then a push rod 156 pushes the third switch of the cop charger so as to switch off the electric circuit of the cop charger C. The cop pocket 73 loaded with a supply cop freely passes by the cop charger C because the push rod 156 does not touch the first switch of the cop charger C.

The cop charger C has a device for loosening the yarn end on the supply cop so that the cop distributed to the spare cop reservoir has a loose yarn end which can be easily retrieved by the suction means. The cop charger C is not a part of this invention though it has a close relation with this fully automatic winder, but is the subject of a further patent application.

*Means for shifting the supply cop from the spare cop reservoir to the working position and ejecting the empty cop from the peg to the conveyor belt.*

Figure 19B:
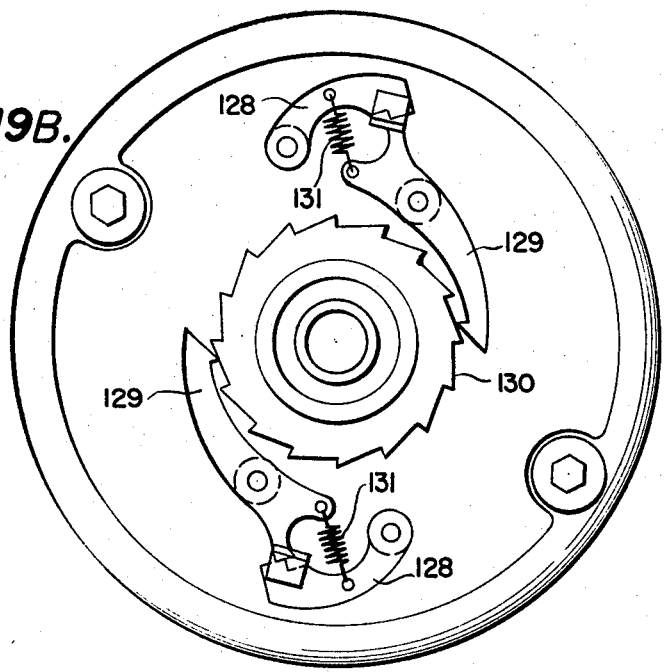
FIGS. 19A and 19B are elevation partly in section, and a plan view respectively of a cop shifting device assembly, showing its detailed elements.
Figure 19A:
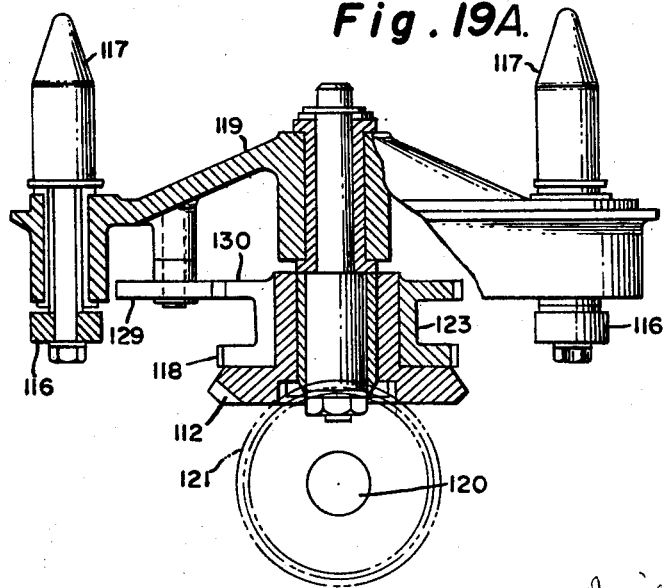

Referring to FIGS. 1, 9, 17, 18A, 18B, 18C and 18D, 19A and 19B, the means for shifting the supply cop from the spare cop reservoir 20 to the working position and ejecting an empty cop from the peg 117 to the conveyor belt 19 comprises the turn table assembly shown in FIG. 19A, the yarn detecting device and the program cam A which controls the relative motion thereof.

As has been stated, the two supply pegs 117 on the turn table 119, are rotatably fixed in a symmetrical arrangement. One of the pegs is for the working cop and the other is for a waiting cop which is situated at the bottom center of the spare cop reservoir 20. When the yarn on the supply cop is exhausted, the detection plate 113 detects the exhaustion of yarn on the supply cop in the same manner as described in the section on the retrieving means.

When the yarn on the supply cop is exhausted, winding operation stops and the program cam A actuates a link 103 of the lever 42 so as to pull a lever 102 to work a crank lever 105 and a moving lever 107 as shown in FIGS. 9 and 18B. In this instance, as there is no remaining yarn mass on the supply cop, the crank lever 106 moves fully in accordance with the full movement of the detection late 113, the crank lever 106 disengages from the edge of the sector part of the stopping lever 108, the stopping lever 108 is moved clockwise by a spring 126 and then a hook lever 128 under the turn table 119 disengages from a pawl lever 129 as shown in FIG. 19B. The pawl lever 129 engages the teeth of a ratchet wheel 130 by the action of a spring 131. Thus the turn table 119 rotates with the ratchet wheel 130 which is being continuously driven by the driving shaft 120 as described above. As the turn table 119 rotates, the pawl lever 129 is disengaged from the teeth of the ratchet wheel 130 by a release guide 135 and engages with the hook lever 128. The turn table 119 then stops its rotation at the correct position guided by a stop cam 133.

The turn table 119 rotates half a turn and stops as stated above and during the rotation of the turn table 119, the waiting cop in the spare cop reservoir 20 is shifted to the working position where the means for retrieving the yarn end from the supply cop works in a manner as described in the section on the retrieving means, while an empty cop is ejected from the peg 117 by a drawing cam 132 and thrown on a conveyor belt 19 and carried to the gear-end side of the apparatus. A guide lever 134 serves as guide to correctly carry the empty cops onto the conveyor belt 19. This means, combined with the means for retrieving the yarn end from the supply cop, is an important feature of this invention.

Automatic cop supplying is an essential factor in automatic winding and a winder without this device will not be entitled to be called a fully automatic winder. Consequently, the invention provides a marked improvement in automatic winding.

*The full package conveyor and the empty bobbin conveyor*

The machine is equipped with a full package conveyor 9 and an empty bobbin conveyor 19.

The full package conveyor 9 runs at the center upper part of the machine and carries full wound packages which an operator puts on the conveyor belt, to the off-end side.

The empty bobbin conveyor 19 runs at the bottom on the both sides of the machine and carries empty bobbins which are automatically thrown on the conveyor belt 19 and carried to the off-end side of the machine.

The detailed drawings and explanations on these conveyors are omitted as they form no part of the present invention.

While a preferred form of construction of the invention with one modification in the arrangement of the parts is herein shown and described by way of example, it is to be understood that the invention is not limited to the present embodiment.

We claim:

1. An automatic winding machine for winding yarn from supply cops into packages, comprising in combination, package winding means, means for detecting a discontinuity of said yarn in a winding operation resulting when said yarn is broken or exhausted, means for sensing the presence or absence of yarn on said supply cop when a discontinuity of yarn is detected, yarn handling means for retrieving yarn ends from said supply cop and said package when said detecting means detects a discontinuity of yarn in said winding operation; means for uniting said retrieved yarn ends, said uniting means being at a stationary position; control means for controlling the motion of said yarn handling means and said uniting means; means for replenishing a supply cop when yarn on said supply cop is exhausted, means for repeating the operation of said yarn handling means and said uniting means when a previous operation fails to properly unite said ends of yarn, said yarn handling means comprising suction means for finding yarn ends from said cop and said package and carrying said yarn ends to said uniting means and control valves for actuating said suction means, said means for replenishing a supply cop comprising a turn table having a plurality of pegs disposed at symmetrical positions on said table, means for turning said table when yarn on a supply cop supported by a peg in winding position is exhausted, a spare cop reservoir disposed at each winding unit, actuating means for actuating said spare cop reservoir so as to transfer a spare cop to an empty peg of said turn table, means for carrying a plurality of supply cops comprising a belt which moves around the machine during operation and a plurality of cop-holding pockets secured at spaced intervals on said belt, means for transferring a supply cop from a pocket on said belt to said cop reservoir and means for removing an exhausted cop from said turn table.

2. An automatic winding machine according to claim 1, in which said suction means comprises a suction pipe extending to a position adjacent said supply cop and a suction nozzle extending to a position adjacent said package, said control valves comprising valve means connecting said suction pipe and suction nozzle to a main suction duct, said suction pipe being provided with a slit disposed along an edge of said suction pipe at an inner side with the top portion of said slit surrounding said uniting means and a bottom portion of said slit extending to the lower end of said suction pipe, said suction nozzle having a mouth disposed at its upper end and a slit connected to said mouth and facing said uniting means, said valve means being opened by said control means so as to produce a suction in said suction pipe and suction nozzle at the same time, whereby yarn ends of said supply cop and package are retrieved simultaneously in said suction nozzle and pipe and are carried through said slits respectively to said uniting means.

3. An automatic winding machine according to claim 2, in which said nozzle is movable from a retracted position toward said package to retrieve a yarn end therefrom, and in which said winding means, yarn handling means and uniting means are at stationary locations except for said movement of said nozzle.

4. An automatic winding machine according to claim 1, further comprising means for rotating said supply cop in an unwinding direction during operation of said yarn handling means to retrieve an end of yarn from said supply cop.

5. An automatic winding machine according to claim 1, in which said control means comprises a cam shaft, power means for driving said cam shaft, and a plurality of programming cams secured to said cam shaft, said cams controlling in predetermined sequence said yarn handling means and said uniting means, and means controlled by said detecting means for initiating the actuation of said control cams.

6. An automatic winding machine according to claim 1, further comprising means for stopping the winding operation when yarn ends are not retrieved and successfully united despite a predetermined repetition of the cycle of said yarn handling operation.

7. An automatic winding machine according to claim 1, in which said detecting means comprises a detecting wire which actuates said control means when said detecting wire detects the absence of said yarn passing through said detecting wire during winding operation.

8. An automatic winding machine according to claim 1, further comprising means for stopping the winding operation of a winding unit, said means comprising a sizing means for measuring the diameter of a package being wound and a link motion for disengaging a driving pulley from a driving drum of said winding unit which drives a winding package by means of frictional contact during winding when said sizing means detects the predetermined size of said winding package.

References Cited

UNITED STATES PATENTS

| | | | |
|---|---|---|---|
| 2,177,763 | 10/1939 | Abbott et al. | 242—35.6 |
| 2,675,971 | 4/1954 | Abbott | 242—35.6 |
| 2,338,914 | 1/1944 | Esser et al. | 242—35.6 |
| 2,733,870 | 2/1956 | Furst | 242—35.6 |
| 2,736,505 | 2/1956 | Furst et al. | 242—36 |
| 2,752,103 | 6/1956 | Furst | 242—36 |
| 2,757,874 | 8/1956 | Marcellus | 242—35.6 |
| 2,764,362 | 9/1956 | Goodhue et al. | 242—35.6 |
| 2,769,599 | 11/1956 | Furst | 242—35.6 |
| 2,936,130 | 5/1960 | Reiners et al. | 242—35.6 |
| 3,057,577 | 10/1962 | Ruhl | 242—128 |
| 3,078,054 | 2/1963 | Furst | 242—35.5 |
| 3,111,280 | 11/1963 | Reiners et al. | 242—35.5 |
| 3,168,257 | 2/1965 | Perry | 242—35.5 |
| 3,182,925 | 5/1965 | Livingston | 242—35.6 X |
| 3,236,466 | 2/1966 | Yoshida et al. | 242—35.5 |

STANLEY N. GILREATH, *Primary Examiner.*